US007593405B2

(12) United States Patent
Shirazipour et al.

(10) Patent No.: US 7,593,405 B2
(45) Date of Patent: Sep. 22, 2009

(54) INTER-DOMAIN TRAFFIC ENGINEERING

(75) Inventors: Meral Shirazipour, Brossard (CA); Yves Lemieux, Kirkland (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 527 days.

(21) Appl. No.: 11/249,428

(22) Filed: Oct. 14, 2005

(65) Prior Publication Data

US 2006/0126630 A1 Jun. 15, 2006

Related U.S. Application Data

(60) Provisional application No. 60/634,276, filed on Dec. 9, 2004.

(51) Int. Cl.
*H04L 12/28* (2006.01)
(52) U.S. Cl. .......................... 370/392; 370/351
(58) Field of Classification Search .............. None
See application file for complete search history.

(56) References Cited

U.S. PATENT DOCUMENTS

| 6,466,985 | B1 * | 10/2002 | Goyal et al. | 709/238 |
|---|---|---|---|---|
| 6,538,416 | B1 * | 3/2003 | Hahne et al. | 370/431 |
| 6,708,209 | B1 | 3/2004 | Ebata et al. | 709/223 |
| 6,914,886 | B2 * | 7/2005 | Peles et al. | 370/254 |
| 6,993,593 | B2 * | 1/2006 | Iwata | 709/238 |
| 7,082,102 | B1 * | 7/2006 | Wright | 370/229 |
| 2002/0087699 | A1 * | 7/2002 | Karagiannis et al. | 709/227 |
| 2002/0147828 | A1 * | 10/2002 | Chen et al. | 709/231 |
| 2003/0117954 | A1 * | 6/2003 | De Neve et al. | 370/230 |
| 2003/0225873 | A1 * | 12/2003 | Wade | 709/223 |
| 2004/0260796 | A1 * | 12/2004 | Sundqvist et al. | 709/223 |
| 2006/0036719 | A1 * | 2/2006 | Bodin et al. | 709/223 |
| 2006/0117110 | A1 * | 6/2006 | Vasseur et al. | 709/232 |

OTHER PUBLICATIONS

Ibrahim Okumus et al, Scalability of Inter-Domain Edge Tunnels Using Bandwidth Brokers: A region-Based Approach, Mar. 1, 2003.*
Yu-Kung Ke et al, Aggregation Algorithms for Asymmetric QoS-Routing Information, 2001.*
Y. Rekhter et al., A Border Gateway Protocol 4 (BGP-4), Network Working Group, RFC 1771, Mar. 1995.
Y. Rekhter et al., Application of the Border Gateway Protocol in the Internet, Network Working Group, RFC 1772, Mar. 1995.
Raymond Zhang et al., MPLS Inter-AS Traffic Engineering Requirements, IETF Internet Draft, Sep. 2004, draft-ietf-tewg-interas-mpls-te-req-09.txt.

(Continued)

*Primary Examiner*—Phirin Sam
(74) *Attorney, Agent, or Firm*—Alex Nicolaescu; Ericsson Canada Inc.

(57) ABSTRACT

Methods and router for receiving a request message addressed from a first router to setup an inter-domain QoS reservation toward a second router in a further domain, forwarding the request message to setup the inter-domain QoS reservation, receiving an acknowledgment message to confirm that the inter-domain QoS reservation is setup, reserving resources in accordance with the inter-domain QoS reservation, forwarding the acknowledgment message toward the first router, receiving a packet related to the inter-domain QoS reservation and encapsulating, toward the second router, the packet in accordance with the inter-domain QoS reservation by adding a first label to the packet, the first label indicating that the packet is not for delivery in the current domain. Optionally, the methods and the router could encapsulate the first label and the packet by adding a second label thereto, wherein the second label enables proper routing of the thereby encapsulated packet within the current domain.

10 Claims, 4 Drawing Sheets

OTHER PUBLICATIONS

Arthi Ayyangar et al., Inter Domain GMPLS Traffic Engineering—RSVP-TE Extensions, IETF Internet Draft, Feb. 2005, draft-ietf-ccamp-inter-domain-rsvp-te-00.txt.

Christian Jacquenet, An Approach to Inter-Domain Traffic Engineering, Conference WTC 2002, Paris, France, Sep. 2002, http://www.ist-tequila.org/publications.

Kartikeya Chandrayana et al., Search Strategies in Inter-Domain Traffic Engineering, ACM Sigcomm 2004.

IST 1999-20675 Atrium, A Testbed of terabit IP routers running MPLS over DWDM, TF-NGN meeting, Jun. 18, 2001, http://www.alcatel.be/atrium.

* cited by examiner

INTER-DOMAIN TRAFFIC ENGINEERING

PRIORITY STATEMENT UNDER 35 U.S.C S.119 (e) & 37 C.F.R. S.1.78

This non-provisional patent application claims priority based upon the prior U.S. provisional patent applications entitled "Inter-domain traffic engineering in the Internet", application No. 60/634,276, filed Dec. 9, 2004, in the name of Meral Shirazipour, Yves Lemieux and Samuel Pierre.

BACKGROUND OF THE INVENTION

1. Field of the Invention

The present invention relates to Quality of Service (QoS) for packet traffic and, more particularly, to QoS guarantee for packet traffic transiting through more than one sub network also referred to as Autonomous System (AS).

2. Description of the Related Art

At the moment there is a trend toward all-Internet Protocol (IP) communication. However, IP has been based on a best effort paradigm by which traffic is served in a first-in first-out (FIFO) manner. The problem comes from the fact that time-affected services require a minimal quality of service (QoS) guarantee. Many solutions were developed to address the problem. In the end, it all aims at getting the best performance from the network while optimizing its resource utilization. That is often referred to as traffic engineering. Most traffic engineering techniques are based on the assumption that the engineered traffic will remain within one or few networks under a common administration. However, research shows that most time-affected services usually span across two to eight autonomous systems (AS). This implies that traffic engineering techniques need to support the traffic across more than one AS.

Unfortunately, little work has been done in the inter-AS or inter-domain traffic engineering field. Many techniques rely on the use of Border Gateway Protocol (BGP), which is the inter-domain routing protocol used in IP networks. BGP is defined at length by the Internet Engineering Task Force (IETF) under the Request For Comment (RFC) number 1771 and 1772, which is herein included by reference. The current inter-domain traffic engineering techniques make use of common BGP path attributes to prefer some inter-domain routes to others. However, these techniques do not provide sufficient reliability to support time-affected services, which require a QoS guarantee not only from each of the traversed AS, but also on an overall end-to-end perspective. Moreover, some further aspects of an acceptable solution are not present in the current inter-domain traffic engineering techniques. For instance, there is a lack granularity that prevents per flow discrimination of QoS.

As can be appreciated, the current inter-domain traffic engineering techniques fall short at providing a QoS reservation and packet forwarding solution that would fulfill the needs of time-affected services that are provided over multiple AS.

SUMMARY OF THE INVENTION

A first aspect of the invention is directed to a method for forwarding packets from a first router in a first domain to a second router in a second domain. The first and second domains are connected via a series of further routers. The method comprises the steps of receiving, at the first router, a packet addressed to a node reachable via the second router and detecting, at the first router, that an inter-domain QoS reservation is needed. Thereafter, the method follows with step of sending, at the first router, a request message to setup the inter-domain QoS reservation toward the second router. Following reception, at the first router, of an acknowledgment message to confirm that the inter-domain QoS reservation is setup, the method follows with a step of reserving, at the first router, resources in accordance with the inter-domain QoS reservation. The method then continues with a step of encapsulating toward the second router, at the first router, the packet in accordance with the inter-domain QoS reservation by adding a first label to the packet, the first label indicating that the packet is not for delivery in the first domain.

Optionally, the method could comprise a step of encapsulating toward the second router, at the first router, the first label and the packet by adding a second label thereto, wherein the second label enables proper routing of the thereby encapsulated packet within the first domain.

The step of reserving could further be performed before the step of sending.

Another optional behavior of the invention suggests that the step of encapsulating further comprises setting the value of the first label to a value indicating that the packet is not for delivery in the first domain and that the packet is currently transiting between the first domain and a further domain, the further domain being one of the second domain or another domain.

Yet another optional behavior of the invention suggests that the step of encapsulating further comprises setting the value of the first label to a value indicating that the packet is not for delivery in the first domain and that the packet is currently transiting within the first domain.

A second aspect of the invention is directed to a method for forwarding packets from a first router in a first domain to a second router in a second domain. The first and second domains being connected via a plurality of further routers. The method comprises the steps of receiving, at a specific router of the plurality of routers, a request message to setup an inter-domain QoS reservation toward the second router. The specific router is in a further domain and the further domain is a member of a group consisting of the first domain, the second domain and another domain. The method then follows with the step of forwarding, at the specific router, the request message to setup the inter-domain QoS reservation toward the second router. Thereafter, the method continues by receiving, at the specific router, an acknowledgment message to confirm that the inter-domain QoS reservation is setup and reserving, at the specific router, resources in accordance with the inter-domain QoS reservation. Then, the following steps are performed for forwarding the acknowledgment message toward the first router, receiving, at the specific router, a packet related to the inter-domain QoS reservation and encapsulating toward the second router, at the specific router, the packet in accordance with the inter-domain QoS reservation by adding a first label to the packet, the first label indicating that the packet is not for delivery in the further domain.

Optionally, the method could comprise a step of encapsulating toward the second router, at the specific router, the first label and the packet by adding a second label thereto, wherein the second label enables proper routing of the thereby encapsulated packet within the further domain.

The step of reserving could further be performed before the step of forwarding.

An option also suggests that the step of encapsulating further comprises setting the value of the first label to a value indicating that the packet is not for delivery in the further domain and that the packet is currently transiting between the further domain and an other domain, the other domain being one of the second domain or another domain.

Yet another optional behavior of the invention suggests that the step of encapsulating further comprises setting the value of the first label to a value indicating that the packet is not for delivery in the further domain and that the packet is currently transiting within the further domain.

A third aspect of the invention is directed to a router in a current domain. The router comprises an input-output means for receiving and sending packets and messages, a routing module for performing regular routing tasks of the router and a reservation module. The reservation module receives a request message, via the input-output means, addressed from a first router to setup an inter-domain QoS reservation toward a second router, the second router being in a further domain, forwards toward the second router the request message to setup the inter-domain QoS reservation, receives an acknowledgment message to confirm that the inter-domain QoS reservation is setup, reserves resources in accordance with the inter-domain QoS reservation, forwards the acknowledgment message toward the first router, receives a packet related to the inter-domain QoS reservation and encapsulates toward the second router the packet in accordance with the inter-domain QoS reservation by adding a first label to the packet, the first label indicating that the packet is not for delivery in the current domain.

Optionally, the reservation module of the router could further encapsulate toward the second router the first label and the packet by adding a second label thereto, wherein the second label enables proper routing of the thereby encapsulated packet within the current domain.

Yet another option is for the reservation module of the router to further receive a packet addressed to a node reachable via a third router, detecting that an inter-domain QoS reservation is needed and sending a further request message to setup the inter-domain QoS reservation toward the third router.

BRIEF DESCRIPTION OF THE DRAWINGS

A more complete understanding of the present invention may be obtained by reference to the following Detailed Description when taken in conjunction with the accompanying drawings wherein.

DETAILED DESCRIPTION OF THE PREFERRED EMBODIMENTS

Multi-Protocol Label Switching (MPLS) is currently used in various network configurations in order to provide a simple and efficient forwarding mechanism in packet switched networks. One main feature of MPLS is to associate all packets related to a single communication on a specific path by using a specific label. Once the path is established using a Resource ReserVation Protocol (RSVP), MPLS enabled-routers then simply have to forward all packets in accordance with their respective label. A complete overview of MPLS and RSVP can be obtained at the IETF under the RFC number 3031 for MPLS and 2205, 2750 and 3209 for RSVP, all of which are herein included by reference. However, MPLS as known today can only be deployed inside a uniquely administrated network or Autonomous System (AS) since the label attribution mechanism would otherwise be inefficient.

The present invention can extend MPLS to enable inter-AS deployment of Label Switched Paths (LSP). In the MPLS context, the present invention uses the capability of MPLS to support label stacking. Some specific label values are stacked with usual label values. Since the specific label values are known to all routers to serve the inter-domain functionality, they are used, within a current AS, to signal that a related LSP is an inter-AS LSP and to signal that the inter-AS LSP is transiting through the current AS or transiting between two ASs. The present invention can further extend RSVP in order to support deployment of the inter-AS LSP.

While the invention could be seen from the angle of MPLS, it could also be seen from a more general perspective. The following description is made generic and the reader is invited to refer to MPLS as one example of current technologies that could be adapted to support the present invention. Furthermore, necessary adaptations to MPLS could be mentioned, but are not necessarily mentioned within the following description.

Similarly, the packet traffic transported on an inter-AS path is likely to be IP packet traffic. However, the present invention is not limited to the transportation of IP packets on the inter-AS path. Therefore, the following description is made generic and the reader is invited to refer to IP packets as one example of packets that could be transported on the inter-AS path of the present invention. Time affected services making use of the inter-AS path of the present invention are, consequently, likely to be IP services such as Voice over IP (VoIP), but could also be any other type of services.

Figure 1:
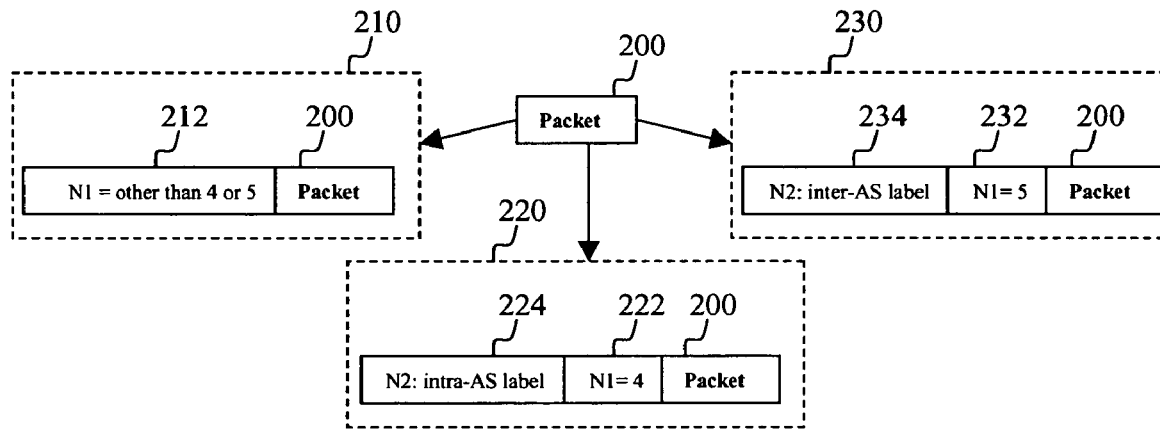
FIG. 1 is a block diagram of exemplary packet encapsulations in accordance with the teachings of the present invention.

Reference is now made to the drawings where FIG. 1 shows a block diagram of exemplary packet 200 encapsulations in accordance with the teachings of the present invention. The packet 200 represents any type of packet before any treatment related to the present invention. The packet 200 can represent raw data taken directly from an application, by is likely to represent an already encapsulated form of the application's data. This falls outside the scope of the present invention, which is not limited to any specific layer with reference to the Open Systems Interconnect (OSI) network model.

A first encapsulation example 210 potentially used by the present invention is a conventional label encapsulation of the packet 200 using MPLS. A label 212 is added to the packet 200. The packet 200 encapsulated with the label 212 is understood only within a specific AS, as specified by MPLS.

A second example 220 potentially used by the present invention is an intra-domain label encapsulation of the packet 200. The packet 200 is encapsulated with a first label 222. The first label 222 has a known value informing involved routers that the packet 200 thereby encapsulated relates to inter-domain traffic and that the packet 200 is currently transiting within an AS (by opposition to transiting between two ASs). In other words, the packet 200 when encapsulated with the first label 222 is not for delivery in the AS, but is transiting within a given domain toward a further domain. The packet 200 and the first label 222 are further encapsulated with a second label 224 to indicate how the packet 200 is to be treated at this given position within the AS. In the context of MPLS, the first label 222 could conveniently be set to 4 since it is a reserved value not yet used in conventional MPLS.

A third example 230 potentially used by the present invention is an inter-domain label encapsulation of the packet 200. The packet 200 is encapsulated with a first label 232. The first label 232 has a known value informing involved routers that the packet 200 thereby encapsulated relates to inter-domain traffic and that the packet 200 is currently transiting between a first AS and a second AS (by opposition to transiting within an AS). In other words, the packet 200 when encapsulated with the first label 232 is not for delivery in the first AS, but is transiting between the two domains. The packet 200 and the first label 232 are further encapsulated with a second label 234 to indicate how the packet 200 is to be treated at this given position between the two ASs. In the context of MPLS, the first label 232 could conveniently be set to 5 since it is a reserved value not yet used in conventional MPLS. In some implementations, a single value could also be used to indicate that the packet is related to an inter-domain QoS reservation. However, this will prevent the ASs to distinguish between intra-domain traffic and inter-domain traffic, which could be desirable to fine-tune the QoS assignment within a given AS. Furthermore, having different values for inter and intra domain labels provides a wider range of available values.

Figure 2:
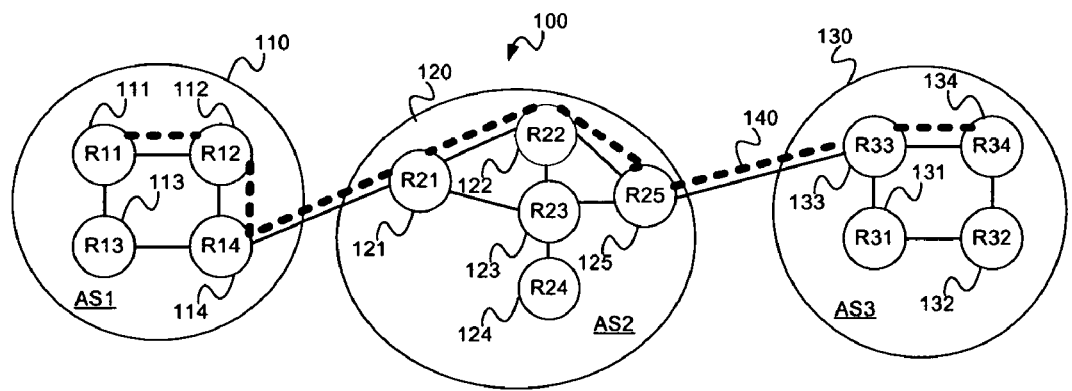
FIG. 2 is an exemplary network topology in accordance with the teachings of the present invention.

FIG. 2 shows an exemplary network 100 topology in accordance with the teachings of the present invention. FIG. 2 shows a three Autonomous Systems AS1 110, AS2 120 and AS3 130. Only routers are shown interconnected in the AS1 110, the AS2 120 and the AS3 130 since the teachings of the present invention are mainly aimed at improving those, but it should be understood that the ASs are likely to contain further nodes, which make use of the routing capabilities provided by the various routers (further nodes such as terminating nodes, service nodes, database nodes, etc.). The AS1 110 comprises four routers R11 111, R12 112, R13 113 and R14 114. The AS2 120 comprises five routers R21 121, R22 122, R23 123, R24 124 and R25 125. The AS3 130 comprises four routers R31 131, R32 132, R33 133 and R34 134. Various links are further shown connecting the routers in their respective AS. The R14 114 in the AS1 110 is further connected to the R21 121 of the AS2 120 and the R25 125 in the AS2 120 is further connected to the R33 133 of the AS3 130. The R14 114, the R21 121, the R25 125 and the R33 133 are usually referred to as border routers since they enable connection of their respective AS toward other systems (e.g. other AS, third party service provider, single node, etc.).

Figure 3:
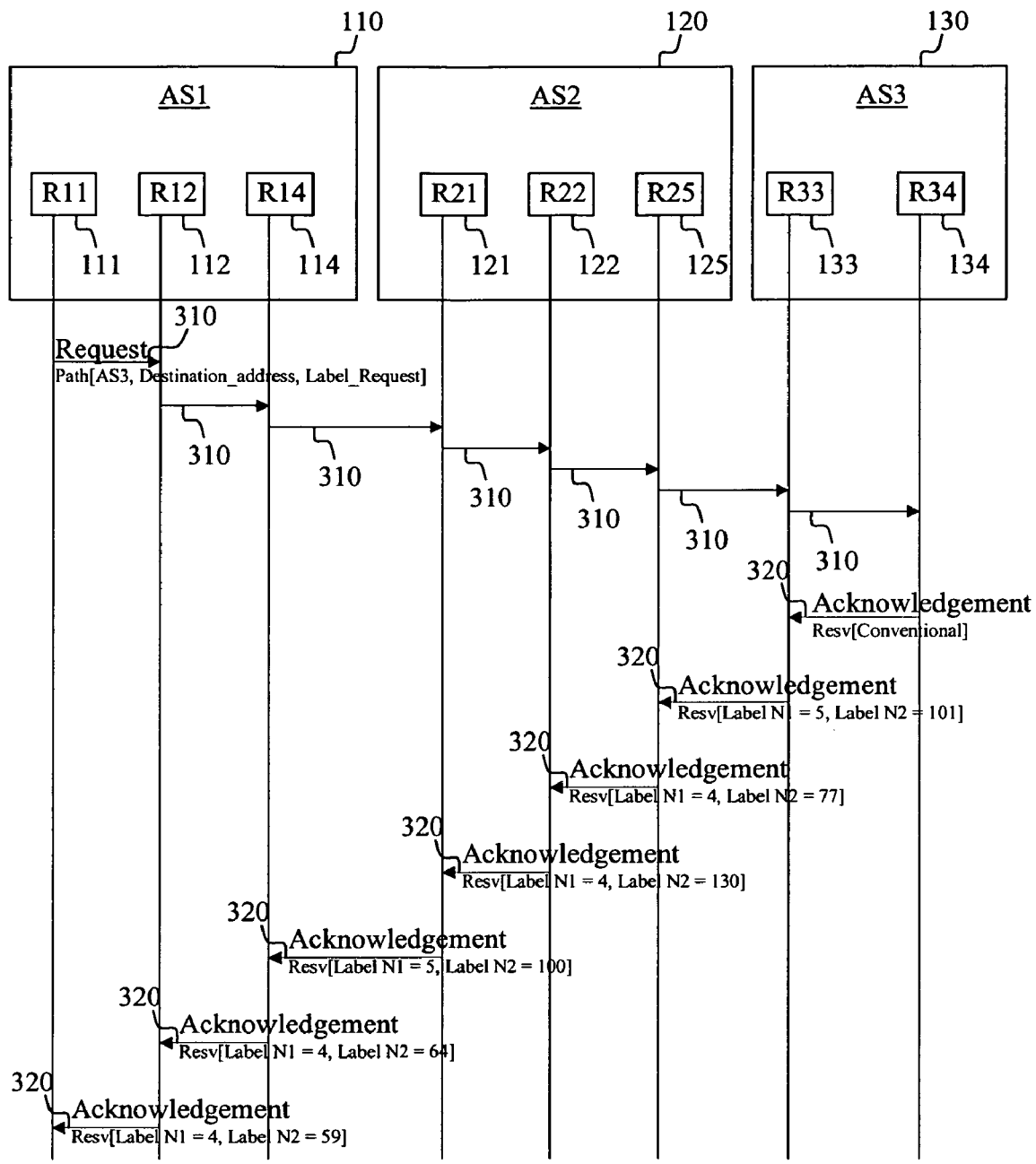
FIG. 3 is an exemplary nodal operation and flow chart of an inter-domain path setup in accordance with the teachings of the present invention.

Reference is now concurrently made to FIG. 2 and FIG. 3, which shows an exemplary nodal operation and flow chart of an inter-domain path setup in accordance with the teachings of the present invention.

In the shown example, the R11 111 of the AS1 110 receives packets addressed to a destination that the R34 134 is best positioned to reach (e.g. using information provided through a routing protocol such as BGP. BGP could also provide the information on the destination AS (i.e. the AS3 130). Once it is determined that the R34 134 is not in the AS1 110, the R11 111 sends a request message 310 addressed to the R34 134. The message is forwarded along the way up to the R34 134. The request message 310 contains the address of the R11 111 (as its source address) and contains sufficient indication for the R34 134 to understand that an inter-domain QoS reservation of resources needs to take place. In the context of MPLS, the request message 310 could be a modified RSVP Path message having the following structure [AS3, Destination_address, Label_Request]. As an optional behavior, it is possible for the R11 111 to establish the inter-domain QoS reservation with the first router available within the AS3 130 instead of the last router, as shown. That leaves the matter of routing the traffic within the final AS to the AS itself.

Upon reception of the request message 310, the R34 134 replies with an acknowledgment message 320. The acknowledgement message 320 is forwarded back to the source of the request message 310 (i.e. the R11 111 in the present example). The acknowledgment message 320 contains information necessary to reserve the resources along the way between the two routers R11 111 and R34 134. In the present example, the acknowledgement message 320 specifies label values to be used (following rules exemplified in FIG. 1). The first labels should clearly identify the traffic as being related to inter-domain QoS reservations. This means that all routers compatible with the present invention need to understand the chosen values. The determination of the actual values of the second labels is outside the scope of the present example. The determined values of the second labels should enable proper routing of the packets between the R11 111 and the R34 134, on a hop-by-hop basis. It should also be noted that any given router should be able to support multiple QoS reservations for different sources and destinations. In the context of MPLS, the acknowledgment message 320 could be a modified RSVP reservation or RESV message. Examples of each individual RESV messages are shown under the corresponding arrow on FIG. 3. Upon reception of the acknowledgment message 320, the R11 111 knows that proper QoS reservation has occurred toward the R34 134 and that it is now possible to sends packets to the R34 134 using the label values from the acknowledgment message. Alternatively, the request message 310 could contain the label values, which would be confirmed by the acknowledgment message 320.

The following table contains example of the label values used in the example of FIG. 3:

| | | | | |
|---|---|---|---|---|
| Before R11 | → | | | Packet |
| R11 | → | N2 = 59 | N1 = 4 | Packet |
| R12 | → | N2 = 64 | N1 = 4 | Packet |
| R14 | → | N2 = 100 | N1 = 5 | Packet |
| R21 | → | N2 = 130 | N1 = 4 | Packet |
| R22 | → | N2 = 77 | N1 = 4 | Packet |
| R25 | → | N2 = 101 | N1 = 5 | Packet |
| R33 | → | | N1 = 43 | Packet |
| R34 | → | | | Packet |

The QoS reservation resulting of the procedure shown on FIG. 3 is shown on FIG. 2 by the dotted line 140 between the R11 111 and the R 34 134.

Figure 4:
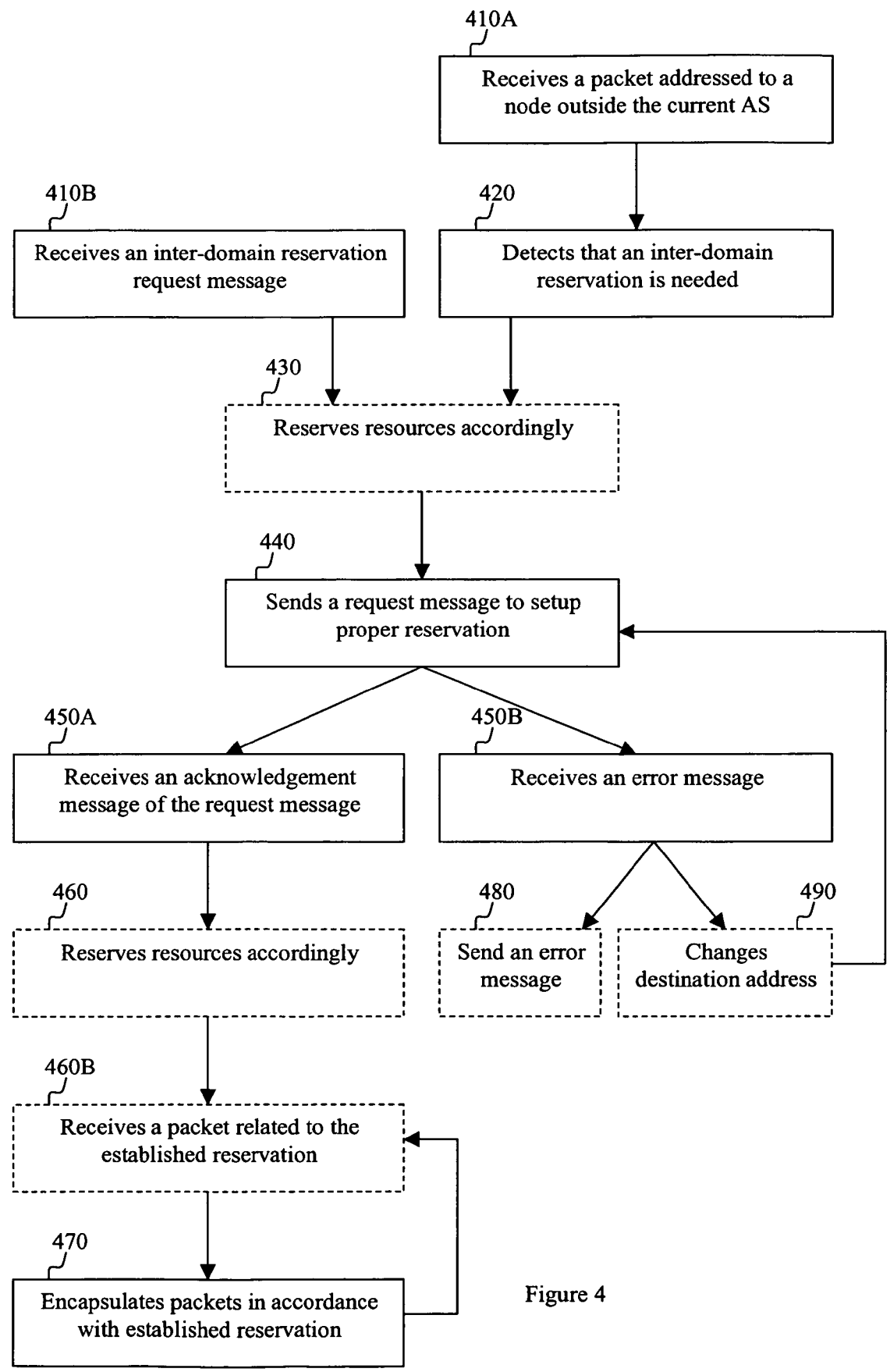
FIG. 4 is a flow chart of the algorithm used by a router to setup reservations and forward packets in accordance with the teachings of the present invention.

FIG. 4 shows a flow chart of the algorithm used by a router of a current AS to setup QoS reservations and forward packets in accordance with the teachings of the present invention. FIG. 4 shows a first alternative in which the router receives packets to be sent in a further AS 410A. The destination address is usually sufficient to indicate that the packets are to be sent to the further AS. Thereafter, the router detects that an inter-domain QoS reservation is needed 420 (e.g. based on policies maintained in the AS). The router can, optionally (as shown by the dashed box), already reserve resources in accordance with the determination of step 420. The router then sends a request message 440 to setup proper QoS reservation to a further router (either inside or outside the current AS). As mentioned before, the request message sent in 440 contains sufficient information for the receiver to understand that an inter-domain QoS reservation of resources needs to take place. The router then either receives and acknowledgment message 450A or an error message 450B. In the case of the acknowledgment message (450A), the router can then reserve resources 460 in accordance with the content of the acknowledgement message itself or with the information known from the request message of step 440. However, the QoS reservation 460 does not occur if it already took place before (e.g. step 430). The packets received thereafter related to the established QoS reservation 460B (determined by the source and destination addresses) are encapsulated and treated in accordance with the QoS reservations 470. If the received message is, however, an error message 450B (e.g. since a router does not support the invention), the router can forward the error message or send a new error message to the source of the message 480 or could also change, e.g., the destination address 490 of the request message to try to avoid the source of error. The router then goes back to step 440 for sending the newly built request message. A second alternative of the invention occurs when the router directly receives a request message 410B instead of packets as in 410A. The router then continues with steps 430 as shown above.

Figure 5:
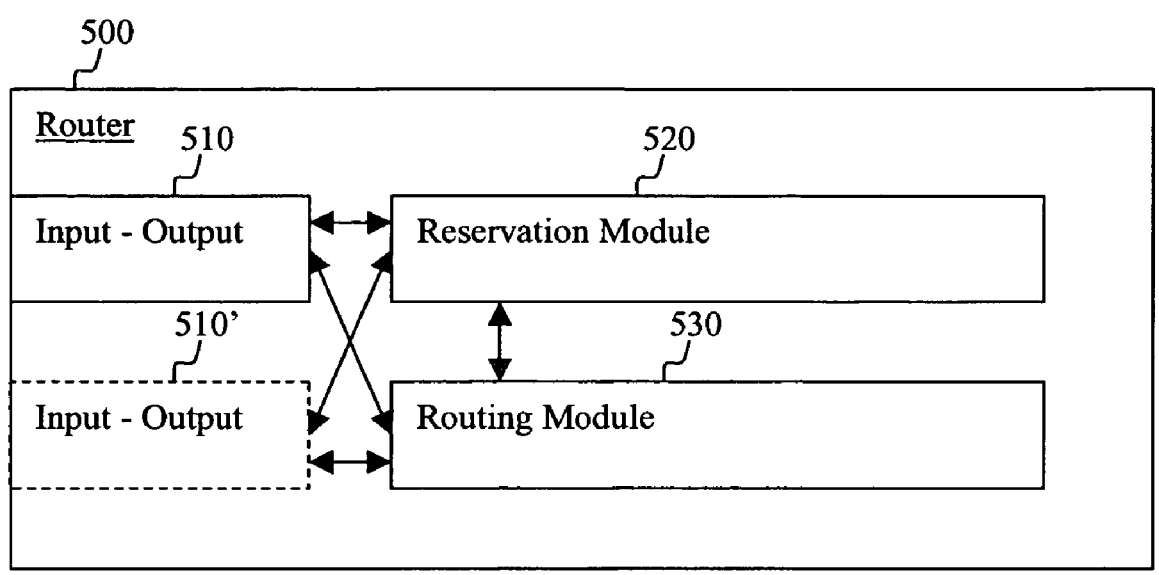
FIG. 5 is a modular representation of a router in accordance with the teachings of the present invention.

FIG. 5 shows a modular representation of a router 500 in accordance with the teachings of the present invention. The router 500 has at least one input-output port or means 510 and 510' for receiving and sending packets. The router comprises a reservation module 520 comprising means for conducting the logic presented above, for instance, in FIG. 4. The router further comprises a routing module 530 for performing regular tasks of a typical router. The routing module 530 could interact with the reservation module 520 and vice-versa. This could be helpful, as mentioned above, in the determination of the location of destination within or outside a current AS in which the router resides. Not shown on FIG. 5 is the underlying hardware architecture (e.g. memory, processor, etc.) of the router 500 since it does not affect the teachings of the present invention.

Although several examples of the present invention have been illustrated in the accompanying drawings and described in the foregoing description, it will be understood that the invention is not limited to the embodiments disclosed, but is capable of numerous rearrangements, modifications and substitutions without departing from the teachings of the present invention. In general, statements made in the description of the present invention do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale.

What is claimed is:

1. A method for forwarding packets from a first router in a first domain to a second router in a second domain, the first and second domains being connected via a series of further routers, the method comprising the steps of:

receiving, at the first router, a packet addressed to a node reachable via the second router;

detecting, at the first router, that an inter-domain QoS reservation is needed;

sending, at the first router, a request message to setup the inter-domain QoS reservation toward the second router;

receiving, at the first router, an acknowledgment message to confirm that the inter-domain QoS reservation is setup;

reserving, at the first router, resources in accordance with the inter-domain QoS reservation;

encapsulating toward the second router, at the first router, the packet in accordance with the inter-domain QoS reservation by adding a first label to the packet, the first label indicating that the packet is not for delivery in the first domain; and encapsulating toward the second router, at the first router, the first label and the packet by adding a second label thereto, the second label enabling proper routing of the thereby encapsulated packet within the first domain.

2. The method of claim 1 wherein the step of reserving is performed before the step of sending.

3. The method of claim 1 wherein the step of encapsulating toward the second router, at the first router, the packet in accordance with the inter-domain QoS reservation by adding a first label to the packet further comprises setting the value of the first label to a value indicating that the packet is not for delivery in the first domain and that the packet is currently transiting between the first domain and a further domain, the further domain being one of the second domain or another domain.

4. A method for forwarding packets from a first router in a first domain to a second router in a second domain, the first and second domains being connected via a series of further routers, the method comprising the steps of:

receiving, at the first router, a packet addressed to a node reachable via the second router;

detecting, at the first router, that an inter-domain QoS reservation is needed;

sending, at the first router, a request message to setup the inter-domain QoS reservation toward the second router;

receiving, at the first router, an acknowledgment message to confirm that the inter-domain QoS reservation is setup;

reserving, at the first router, resources in accordance with the inter-domain QoS reservation;

encapsulating toward the second router, at the first router, the packet in accordance with the inter-domain QoS reservation by adding a first label to the packet, the first label indicating that the packet is not for delivery in the first domain, wherein the step of encapsulating further comprises setting the value of the first label to a value indicating that the packet is not for delivery in the first domain and that the packet is currently transiting within the first domain.

5. A method for forwarding packets from a first router in a first domain to a second router in a second domain, the first and second domains being connected via a plurality of further routers, the method comprising the steps of:

receiving, at a specific router of the plurality of routers, a request message to setup an inter-domain QoS reservation toward the second router, the specific router being in a further domain, the further domain being a member of a group consisting of the first domain, the second domain and another domain;

forwarding, at the specific router, the request message to setup the inter-domain QoS reservation toward the second router;

receiving, at the specific router, an acknowledgment message to confirm that the inter-domain QoS reservation is setup;

reserving, at the specific router, resources in accordance with the inter-domain QoS reservation;

forwarding the acknowledgment message toward the first router;

receiving, at the specific router, a packet related to the inter-domain QoS reservation; and encapsulating toward the second router, at the specific router, the packet in accordance with the inter-domain QoS reservation by adding a first label to the packet, the first label indicating that the packet is not for delivery in the further domain; and encapsulating toward the second router, at the specific router, the first label and the packet by adding a second label thereto, the second label enabling proper routing of the thereby encapsulated packet within the further domain.

6. The method of claim 5 wherein the step of reserving is performed before the step of forwarding.

7. The method of claim 5 wherein the step of encapsulating toward the second router, at the specific router, the packet in accordance with the inter-domain QoS reservation by adding a first label to the packet, further comprises setting the value of the first label to a value indicating that the packet is not for delivery in the further domain and that the packet is currently transiting between the further domain and an other domain, the other domain being one of the second domain or another domain.

8. A method for forwarding packets from a first router in a first domain to a second router in a second domain, the first and second domains being connected via a plurality of further routers, the method comprising the steps of:

receiving, at a specific router of the plurality of routers, a request message to setup an inter-domain QoS reservation toward the second router, the specific router being in a further domain, the further domain being a member of a group consisting of the first domain, the second domain and another domain;

forwarding, at the specific router, the request message to setup the inter-domain QoS reservation toward the second router;

receiving, at the specific router, an acknowledgment message to confirm that the inter-domain QoS reservation is setup;

reserving, at the specific router, resources in accordance with the inter-domain QoS reservation;

forwarding the acknowledgment message toward the first router;

receiving, at the specific router, a packet related to the inter-domain QoS reservation; and encapsulating toward the second router, at the specific router, the packet in accordance with the inter-domain QoS reservation by adding a first label to the packet, the first label indicating that the packet is not for delivery in the further domain, wherein the step of encapsulating further comprises setting the value of the first label to a value indicating that the packet is not for delivery in the further domain and that the packet is currently transiting within the further domain.

9. A router in a current domain comprising:

an input-output means for receiving and sending packets and messages;

a routing module for performing regular routing tasks of the router; and a reservation module:

receiving a request message, via the input-output means, addressed from a first router to setup an inter-domain QoS reservation toward a second router, the second router being in a further domain;

forwarding toward the second router the request message to setup the inter-domain QoS reservation;

receiving an acknowledgment message to confirm that the inter-domain QoS reservation is setup;

reserving resources in accordance with the inter-domain QoS reservation;

forwarding the acknowledgment message toward the first router;

receiving a packet related to the inter-domain QoS reservation;

encapsulating toward the second router the packet in accordance with the inter-domain QoS reservation by adding a first label to the packet, the first label indicating that the packet is not for delivery in the current domain and encapsulating toward the second router the first label and the packet by adding a second label thereto, the second label enabling proper routing of the thereby encapsulated packet within the current domain.

10. A router in a current domain comprising:

an input-output means for receiving and sending packets and messages;

a routing module for performing regular routing tasks of the router; and a reservation module:

receiving a request message, via the input-output means, addressed from a first router to setup an inter-domain QoS reservation toward a second router, the second router being in a further domain;

forwarding toward the second router the request message to setup the inter-domain QoS reservation;

receiving an acknowledgment message to confirm that the inter-domain QoS reservation is setup;

reserving resources in accordance with the inter-domain QoS reservation;

forwarding the acknowledgment message toward the first router;

receiving a packet related to the inter-domain QoS reservation;

encapsulating toward the second router the packet in accordance with the inter-domain QoS reservation by adding a first label to the packet, the first label indicating that the packet is not for delivery in the current domain;

receiving a packet addressed to a node reachable via a third router;

detecting that an inter-domain QoS reservation is needed; and sending a further request message to setup the inter-domain QoS reservation toward the third router.

* * * * *